United States Patent
Berlureau et al.

(10) Patent No.: US 6,680,140 B1
(45) Date of Patent: Jan. 20, 2004

(54) MAINTENANCE-FREE INDUSTRIAL TYPE VENTED CELL STORAGE BATTERY

(75) Inventors: Thierry Berlureau, Bordeaux (FR); Jean-Louis Liska, Bordeaux (FR)

(73) Assignee: Alcatel, Paris (FR)

( * ) Notice: Subject to any disclaimer, the term of this patent is extended or adjusted under 35 U.S.C. 154(b) by 775 days.

(21) Appl. No.: 09/127,785

(22) Filed: Aug. 3, 1998

(30) Foreign Application Priority Data

Aug. 4, 1997 (FR) .............................. 97 09950

(51) Int. Cl.⁷ .............................. H01M 10/52
(52) U.S. Cl. .................. 429/57; 429/223; 429/206; 429/248
(58) Field of Search ................. 429/101, 102, 429/59, 57, 60, 223, 206, 248

(56) References Cited

U.S. PATENT DOCUMENTS

| | | | |
|---|---|---|---|
| 4,436,795 A | * 3/1984 | Cooper et al. | ................. 429/53 |
| 4,977,043 A | 12/1990 | Kadouchi et al. | |
| 5,393,617 A | 2/1995 | Klein | |
| 5,576,116 A | * 11/1996 | Sanchez et al. | ................ 429/59 |

FOREIGN PATENT DOCUMENTS

| | | |
|---|---|---|
| EP | 0070646 A1 | 1/1983 |
| EP | 0666608 A1 | 8/1985 |
| EP | 0401076 A1 | 12/1990 |
| GB | 2203280 A | 10/1988 |
| JP | 896833 | 4/1996 |
| WO | WO9011626 | 10/1990 |
| WO | 0504472 A3 | 9/1992 |
| WO | WO9715958 | 5/1997 |

* cited by examiner

Primary Examiner—Patrick Ryan
Assistant Examiner—R Alejandro
(74) Attorney, Agent, or Firm—Sughrue Mion, PLLC

(57) ABSTRACT

An industrial type vented cell storage battery includes an electrode package including at least one positive electrode containing nickel hydroxide, one negative electrode, and one hydrophilic and gas-permeable separator an extension of which beyond said electrode package is in contact with the electrolyte contained in said space. It also includes an oxygen recombination device. It contains an excess quantity of alkaline electrolyte. A space between the base of the electrode package and the bottom of the container contains at least some of the excess quantity of electrolyte.

8 Claims, 1 Drawing Sheet

MAINTENANCE-FREE INDUSTRIAL TYPE VENTED CELL STORAGE BATTERY

BACKGROUND OF THE INVENTION

1. Field of the Invention

Figure 1:
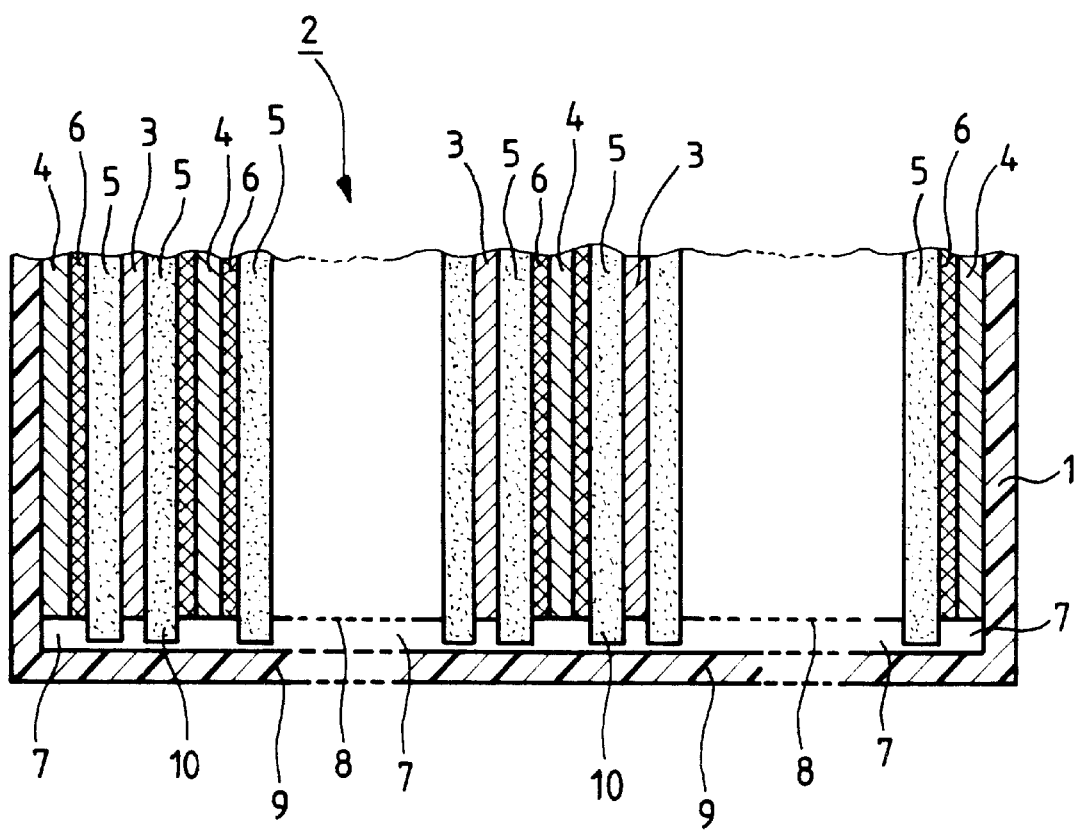

The present invention concerns an industrial type vented cell aqueous electrolyte secondary storage cell requiring no maintenance.

2. Description of the Prior Art

A storage battery is of the "industrial" type if it has a high capacity, greater than 5 Ah and generally in the range 10 Ah to 200 Ah. A storage battery is of the "open" type if it operates at a relative pressure of not more than one bar (pressure difference relative to atmospheric pressure), the maximal operating pressure being fixed by the pressure at which a relief valve opens. An industrial type vented cell storage battery usually has a prism-shape plastics material container which contains plane electrodes. These aqueous alkaline electrolyte storage batteries are usually based on nickel-cadmium (Ni—Cd) and nickel-metal hydride (Ni—MH).

An industrial type vented cell storage battery includes an electrode package comprising a plurality of pairs. Each pair is made up of a positive electrode, a negative electrode and a separator between the positive and negative electrodes that is virtually impermeable to gases. The electrode package is immersed in a free electrolyte the quantity of which is much greater than that strictly required.

The operation of aqueous electrolyte storage batteries causes gases to be released at the end of charging, namely oxygen at the positive electrode and hydrogen at the negative electrode. A vented cell storage battery operates at a low pressure. The gases produced at the end of charging escape via the relief valve, which leads to consumption of the water of the electrolyte. The loss of water is estimated at approximately 0.3 $cm_3$ per ampere-hour. The storage battery therefore requires regular maintenance, in other words water must be added periodically. The maintenance frequency depends on the conditions of use of the storage battery in the application concerned, in particular the charged capacity.

To limit the frequency of topping up the electrolyte level after periods of operation, semi-flooded cell storage batteries have been developed in which the electrode package is immersed only partly in the electrolyte, which allows oxygen generated at the positive electrode access to the non-immersed part of the negative electrode, and so recombination occurs here (EP-0 070 646).

Under the above conditions recombination is never complete and these storage batteries still require maintenance. Also, the non-immersed part of the negative electrodes is exposed to an oxygen atmosphere which can degrade it.

To eliminate all maintenance sealed cell industrial type storage batteries derived from those previously described have been proposed (EP-0 666 608). A sealed cell storage battery operates at a relative pressure that can be higher than 1 bar. In a sealed cell storage battery the electrode package includes a separator between the negative and positive electrodes that is highly permeable to gases, allowing oxygen generated at the positive electrode access to the negative electrode, and so recombination occurs there. A sealed cell storage battery further includes an oxygen recombination device. The oxygen formed at the positive electrode at the end of charging leads to an increase in the internal pressure of the storage battery which depends on the charging current. Afterwards permanent conditions are established in which all of the oxygen produced at the positive electrode is reduced (or "recombined"). The electrolyte is introduced in limited quantities corresponding to the pore volume available in the components (electrodes, separator, recombination device).

The generation of gases can expel electrolyte from the pores in the electrode. This phenomenon shortens the service life of the battery by precipitating drying out of the electrode package. Document FR-1 012 395 proposes to provide a low-capacity sealed cell Ni—Cd storage battery with a volume in which the electrolyte expelled in this way can collect. The separators dip into the electrolyte and return the electrolyte to the electrode package.

Ni—MH storage batteries have a negative electrode in which the electrochemically active material is a hydridable metal alloy. Operation of the electrode in an aqueous medium means that corrosion of the hydridable alloy is inevitable. This reaction leads to additional consumption of water.

Where the electrolyte is introduced in limited quantities into the pores of the components, corrosion leads to premature drying out of the storage battery: its capacity falls and its service life is shortened. Document JP-8-96833 proposes to add in the lower part of an Ni—MH storage battery a chamber containing the electrolyte and separated from the electrode package by a sealed wall. An extension of the separator at the bottom of the electrode package passes through this wall and enters the chamber.

Although this increases the service life, the capacities of sealed cell storage batteries are lower than those of vented cell storage batteries. This is because, during the first cycles, the electrodes do not have enough electrolyte to reach their maximum efficiency. Subsequent addition of electrolyte will not have any effect on efficiency.

The aim of the present invention is to propose an industrial type vented cell storage battery that does not require any maintenance and whose energy per unit mass, energy per unit volume and the service life are increased over those of an industrial type sealed cell storage battery.

SUMMARY OF THE INVENTION

The present invention consists in an industrial type vented cell storage battery comprising:

an electrode package including at least one positive electrode containing nickel hydroxide, one negative electrode, and one hydrophilic and gas-permeable separator an extension of which beyond the electrode package is in contact with electrolyte contained in a space between the base of the electrode package and the bottom of the container adapted to contain at least part of an excess quantity of alkaline electrolyte, and an oxygen recombination device.

Industrial type vented cell storage batteries usually have a prism-shape plastics material (polypropylene) container incapable of withstanding a high pressure (greater than 2 bars relative). In the storage battery of the present invention the separator is permeable to gases to allow oxygen generated at the positive electrode access to the negative electrode. The presence of a recombination device is nevertheless essential because it significantly increases the rate of recombination and enables equilibrium to be obtained at a moderate pressure, even when high charging currents are used. The recombination device includes one or more recombination sites connected to the negative polarity at which the reaction occurs. The device preferably includes a spacer in order to provide a constant volume for gas circulation. The device can include a spacer associated with an auxiliary electrode. A recombination system of the above kind is described in document EP-A-0 666 608 published Sept. 8, 1995, for example.

An industrial type vented cell storage battery is flooded with electrolyte to obtain a high electrode efficiency, higher than that observed in a sealed cell storage battery containing a quantity of electrolyte limited to the volume of the pores of the components. The storage battery of the present invention is flooded with electrolyte (i.e. it contains electrolyte in excess quantity) and includes a space capable of containing at least some of this excess electrolyte. The separator in contact with this electrolyte irrigates the electrode package by capillary action.

This space is between the base of the electrode package and the bottom of the container so that an extension of the separator beyond the bottom of the electrode package dips into the electrolyte contained in it. It can be obtained by raising the electrode package relative to the bottom of the storage battery. This arrangement has the advantage that some of the excess electrolyte is under the electrode package, instead of covering it. Access of the gas to the recombination device will be possible sooner and the storage battery will achieve quasi-sealed operation (without the relief valve opening) faster. Electrolyte losses from the storage battery of the invention will therefore be reduced compared to a prior art storage battery.

During cycling there are three operating phases of the storage battery of the invention. During the first cycles the electrodes obtain their maximum efficiency because the separator supplies them with as much electrolyte as necessary, taken from the excess quantity. The recombination device has not yet reached its full efficiency and the internal pressure can reach values greater than that at which the relief valve opens. There is then a low consumption of electrolyte in each cycle because the relief valve allows the gases to escape. This first phase, which is of very short duration, is not always present. It is succeeded by a second phase in which recombination is effected efficiently and in which the pressure tends to stabilize. Finally, after a few charge/discharge cycles, the internal pressure remains below the pressure at which the relief valve opens. The recombination rate is virtually 100% which means a behavior close to that of a sealed cell storage battery.

After prolonged cycling, the electrodes can dry out, which is a frequent cause of faults in sealed cell storage batteries. In the storage battery of the invention the separator in contact with the excess electrolyte irrigates the electrode package by capillary action during cycling. The service life of the open cell storage battery of the invention is very much longer than that of a sealed cell storage battery.

In the storage battery of the present invention the quantity of electrolyte introduced corresponds to the volume of electrolyte absorbed by the electrode package (electrodes and separator) and the recombination device, constituting a reference quantity, increased by an excess quantity. The total quantity of electrolyte is preferably at least equal to 120% of the quantity of electrolyte contained in the total pore volume of the electrodes, the separator and the device. The excess quantity therefore represents at least 20% of the reference quantity. For example, storage batteries have been constructed containing a quantity of electrolyte equal to 145% and 126% of the quantity of electrolyte contained in the total pore volume.

The total capacity of the negative electrodes is usually greater than that of the positive electrodes. This negative capacity excess is used in a sealed cell storage battery to prevent the release of hydrogen that cannot recombine. In an Ni—MH storage battery it compensates the drop in negative capacity due to corrosion of the alloy.

In a vented cell storage battery the negative electrodes have an overcapacity relative to the capacity of the positive electrodes which is less than in a sealed cell storage battery. The electrodes of the two polarities are overcharged in each cycle and the negative capacity excess merely compensates the effect of corrosion (reduced quantity of active material). In accordance with the present invention, the negative electrodes preferably have a total capacity in the range 100% to 150% of the total capacity of the positive electrodes.

In one variant, the positive electrodes are of the sintered type and the negative electrodes are of the paste type on a conductive support chosen from a two-dimensional support, such as a solid or perforated tape, an expanded metal, a grid or a woven material, and a three-dimensional support, such as a foam or felt support.

In another variant, the positive electrodes are of the paste type on a three-dimensional conductive support and the negative electrodes are of the paste type on a conductive support chosen from a two-dimensional support and a three-dimensional support.

The storage battery of the invention can include negative electrodes containing a hydridable metal alloy as the electrochemically active material.

The maintenance-free storage battery of the invention is particularly suitable for use in aeronautical or railroad applications and for propulsion of electric vehicles.

DETAILED DESCRIPTION OF THE PREFERRED EMBODIMENT

Other features and advantages of the present invention will become apparent from the following illustrative and non-limiting examples and from the accompanying drawing in which the single FIG. represents a storage battery in accordance with the present invention in diagrammatic section.

EXAMPLE

A storage battery A in accordance with the invention was made. As shown in FIG. 1, it included a parallelepiped-shape plastics material container 1 and an electrode package 2 including a plurality of pairs of electrodes made up of a positive electrode 3 and a negative electrode 4 with a separator 5 between them.

The negative electrode 4 was made of a nickel foam in which was disposed a paste comprising a polymer binder, a hydridable metal alloy as the electrochemically active material and the usual shaping additives. The positive electrode 3 was made of a nickel foam into which was incorporated an active material based on nickel hydroxide. The gas-permeable separator 5 was made up of two layers of polypropylene felt. The recombination device comprised recombination sites 6 regularly arranged between the electrodes inside the electrode package and electrically connected to the negative polarity.

The electrolyte was an aqueous solution of potassium hydroxide KOH, sodium hydroxide NaOH and lithium hydroxide LiOH at a total concentration of 8.5 N. The quantity of electrolyte introduced into the storage battery corresponded to the volume of electrolyte absorbed by the electrode package 2 and the sites 6 of the recombination device (reference quantity), plus an excess quantity. This excess quantity represented 45% of the reference quantity.

A space 7 was formed between the base 8 of the electrode package 2 and the bottom 9 of the container 1. Extensions 10 of the separator 5 projected from the electrode package 2 and dipped into the electrolyte in the space 7. For the storage battery A this space occupied a height representing 10% of the height of the electrodes.

The storage battery A was fitted with a relief valve operating at a pressure less than one bar relative. The total capacity $C^-$ of the negative electrodes represented 130% of the total capacity $C^-$ of the positive electrodes. The nominal capacity of storage battery A was 86 Ah.

EXAMPLE 2

For comparison, an industrial sealed cell storage battery E was made. This storage battery differed from storage battery A in that it contained a limited quantity of electrolyte and was fitted with a relief valve operating at a relative pressure greater than or equal to 2 bars. The storage battery B did not have any additional space for the electrolyte.

The total capacity $C^-$ of the negative electrodes represented 160% of the total capacity $C^+$ of the positive electrodes which was higher than for storage battery A and prevented generation of hydrogen at the end of charging of the storage battery. The nominal capacity of storage battery B was 86 Ah.

EXAMPLE 3

For comparison, an industrial type vented cell storage battery C requiring regular maintenance was made. It differed from storage battery A in that it contained a separator virtually impermeable to gases consisting of two layers of polypropylene felt and a microporous membrane and did not contain any recombination device.

The quantity of electrolyte introduced into the storage battery corresponded to the volume of electrolyte absorbed by the electrode package (reference quantity) plus an excess quantity corresponding to complete immersion of the electrode package until the upper end of the electrode package was immersed to a depth of 20 mm. This excess quantity represented 60% of the reference quantity. The nominal capacity of storage battery C was 86 Ah.

EXAMPLE 4

Storage batteries A, B and C were evaluated electrochemically by the following comparative tests. Cycling was carried out under the following conditions:

discharge at Ic/2 of 80% of the nominal capacity (Ic is defined as the current at which the nominal capacity of the storage battery is discharged in one hour), charging at Ic/3 of 84% of the nominal capacity, overcharging at Ic/20 to a total charge coefficient corresponding to 88% of the nominal capacity.

After 650 cycles, the real capacity that the storage batteries were able to return was measured with discharge currents of Ic/3 and 2Ic. The energy per unit mass was evaluated at the same time. The power per unit mass was calculated from the measured internal resistance and the open circuit voltage for a depth of discharge (DOD) of 50%.

The characteristics and the results obtained for the three storage batteries tested are summarized in table I below.

TABLE 1

| battery | A | B | C |
| --- | --- | --- | --- |
| type | invention | sealed cell | vented cell requiring maintenance |
| excess electrolyte | +45% | +17% | +60% |
| separator | permeable | permeable | impermeable |
| recombination system | yes | yes | no |
| relief valve pressure | 1 bar | 2 bars | 1 bar |
| $C^-/C^+$ | 130% | 160% | 130% |
| service life | 1100 cycles | 700 cycles | 1500 cycles (50 cycles without maintenance) |
| capacity after 650 cycles: | | | |
| measured at Ic/3 | 88 Ah | 82 Ah | 88 Ah |
| measured at 2Ic | 88 Ah | 80 Ah | 87 Ah |
| energy per unit mass after 650 cycles: | | | |
| measured at Ic/3 | 73 Wh/kg | 64 Wh/kg | 70 Wh/kg |
| measured at 2Ic | 64 Wh/kg | 55 Wh/kg | 61 Wh/kg |
| Power per unit mass after 100 cycles at 50% of DOD | 240 W/kg | 190 W/kg | 240 W/kg |

There is claimed:

1. An industrial vented cell storage battery comprising:

an electrode package including at least one positive electrode containing nickel hydroxide, one negative electrode, and one hydrophilic and gas-permeable separator, wherein the separator has an extension, which extends beyond said electrode package and is in contact with electrolyte contained in a space between the base of said electrode package and the bottom of said container adapted to contain at least part of an excess quantity of alkaline electrolyte, for irrigating the electrode package by capillary action of the alkaline electrolyte; and said electrode package includes an oxygen recombination device.

2. The storage battery claimed in claim 1 wherein said quantity of electrolyte is at least equal to 120% of the quantity of electrolyte contained in the total pore volume of said electrodes, said separator and said device.

3. The storage battery claimed in claim 1 wherein said negative electrodes have a total capacity in the range 100% to 150% of the total capacity of said positive electrodes.

4. The storage battery claimed in claim 1 wherein said device includes a spacer associated with an auxiliary electrode.

5. The storage battery claimed in claim 1 wherein said positive electrodes are sintered electrodes and said negative electrodes are paste electrodes on a conductive support selected from a two-dimensional support and a three-dimensional support.

6. The storage battery claimed in claim 1 wherein said positive electrodes are paste electrodes on a three-dimensional support and said negative electrodes are paste electrodes on a conductive support selected from a two-dimensional support and a three-dimensional support.

7. The storage battery claimed in claim 1 wherein said negative electrodes contain a hydridable metal alloy as the electrochemically active material.

8. The storage battery claimed in claim 1 where the space occupies a height equal to 10% of the height of the positive and negative electrodes.

* * * * *